(12) United States Patent
Sawai et al.

(10) Patent No.: US 10,845,004 B2
(45) Date of Patent: Nov. 24, 2020

(54) HIGH-PRESSURE CONTAINER AND SHELL REINFORCING LAYER WRAPPING METHOD

(71) Applicant: TOYOTA JIDOSHA KABUSHIKI KAISHA, Toyota (JP)

(72) Inventors: Osamu Sawai, Okazaki (JP); Yuki Kai, Nisshin (JP); Keisuke Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 16/047,608

(22) Filed: Jul. 27, 2018

(65) Prior Publication Data

US 2019/0049068 A1 Feb. 14, 2019

(30) Foreign Application Priority Data

Aug. 10, 2017 (JP) .................. 2017-155783

(51) Int. Cl.
*F17C 1/06* (2006.01)
*B60K 15/03* (2006.01)
*B32B 1/08* (2006.01)

(52) U.S. Cl.
CPC .......... *F17C 1/06* (2013.01); *B60K 15/03006* (2013.01); *B32B 1/08* (2013.01);
(Continued)

(58) Field of Classification Search
CPC .................. F17C 1/06; F17C 2223/036; F17C 2223/0123; F17C 2209/2154; F17C 2201/056; F17C 2203/0619; F17C 2221/012; F17C 2270/0168; F17C 2205/0397; F17C 2201/0119; F17C 2203/012; F17C 2203/0604; F17C 2203/0614; F17C 2203/0646; F17C 2203/0665; F17C 2203/0668; F17C 2209/232; F17C 2270/0184; F17C 1/04; B60K 15/03006; B60K 2015/03315;
(Continued)

(56) References Cited

U.S. PATENT DOCUMENTS 1,651,521 A * 12/1927 Lucas-Girardville ..... F17C 1/06
220/589
3,047,191 A * 7/1962 Young .................. B29D 22/003
220/588
(Continued)

FOREIGN PATENT DOCUMENTS

JP 2004-042277 A 2/2004

*Primary Examiner* — Kareen K Thomas
(74) *Attorney, Agent, or Firm* — Oliff PLC

(57) ABSTRACT

An end of a shell forming a high-pressure container is opened to form an opening. A cap is disposed partially inside the opening to close the opening. A shell reinforcing layer having a first reinforcing layer that is made of a first fiber-reinforced resin having a fiber direction oriented in a circumferential direction, and a second reinforcing layer that is integrated with the first reinforcing layer and made of a second fiber-reinforced resin having a fiber direction oriented in an axial direction, is wrapped in layers around an outer circumferential surface of the shell. The second reinforcing layer is placed over a region of the first reinforcing layer.

9 Claims, 7 Drawing Sheets

(52) U.S. Cl.
CPC . *B32B 2439/40* (2013.01); *B60K 2015/03032* (2013.01); *B60K 2015/03039* (2013.01); *B60K 2015/03046* (2013.01); *B60K 2015/03315* (2013.01); *F17C 2201/0119* (2013.01); *F17C 2201/056* (2013.01); *F17C 2203/012* (2013.01); *F17C 2203/0604* (2013.01); *F17C 2203/0614* (2013.01); *F17C 2203/0619* (2013.01); *F17C 2203/0646* (2013.01); *F17C 2203/0665* (2013.01); *F17C 2203/0668* (2013.01); *F17C 2205/0397* (2013.01); *F17C 2209/2154* (2013.01); *F17C 2209/232* (2013.01); *F17C 2221/012* (2013.01); *F17C 2223/0123* (2013.01); *F17C 2223/036* (2013.01); *F17C 2270/0168* (2013.01); *F17C 2270/0184* (2013.01)

(58) Field of Classification Search
CPC .......... B60K 2015/03032; B60K 2015/03046; B60K 2015/03039; B32B 1/08; B32B 2439/40
USPC ....... 220/581, 586, 588, 589, 590, 591, 592, 220/495.01; 242/174, 176, 178
See application file for complete search history.

(56) References Cited

U.S. PATENT DOCUMENTS

| | | | | |
|---|---|---|---|---|
| 3,228,549 A * | 1/1966 | Courtney | ................... | F17C 1/16 220/589 |
| 3,254,395 A * | 6/1966 | Baehr | ...................... | F02K 9/64 29/890.01 |
| 3,866,792 A * | 2/1975 | Minke | ................... | B29C 53/605 220/589 |
| 3,969,812 A * | 7/1976 | Beck | ...................... | B21D 51/24 29/421.1 |
| 4,168,014 A * | 9/1979 | Schultz | ................. | F16L 59/026 138/147 |
| 4,714,094 A * | 12/1987 | Tovagliaro | ................ | F15B 1/24 138/31 |
| 4,778,073 A * | 10/1988 | Ehs | ...................... | B29C 53/602 220/590 |
| 4,785,956 A * | 11/1988 | Kepler | ................. | B29C 53/605 138/30 |
| 5,025,943 A * | 6/1991 | Forsman | ............... | B29C 53/602 220/589 |
| 5,287,987 A * | 2/1994 | Gaiser | ....................... | F17C 1/16 220/589 |
| 5,499,739 A * | 3/1996 | Greist | .................... | B29C 53/602 138/30 |
| 5,526,994 A * | 6/1996 | Murphy | ................ | B29C 53/602 220/589 |
| 5,556,601 A * | 9/1996 | Huvey | ................. | B29C 53/805 156/172 |
| 5,659,941 A * | 8/1997 | Huvey | ................... | B21D 51/24 29/421.1 |
| 6,230,922 B1 * | 5/2001 | Rasche | ...................... | F17C 1/16 220/586 |
| 7,757,883 B2 * | 7/2010 | Gilbertson | ................ | F17C 1/06 156/169 |
| 8,783,504 B2 * | 7/2014 | Kleschinski | .............. | F17C 1/16 220/590 |
| 2010/0181213 A1 * | 7/2010 | Fujita | .................... | F17C 11/005 206/0.7 |
| 2013/0087567 A1 * | 4/2013 | Kaneko | .................... | F17C 1/06 220/590 |
| 2016/0123538 A1 * | 5/2016 | Nakamura | .............. | F17C 13/06 220/582 |

* cited by examiner

HIGH-PRESSURE CONTAINER AND SHELL REINFORCING LAYER WRAPPING METHOD

INCORPORATION BY REFERENCE

The disclosure of Japanese Patent Application No. 2017-155783 filed on Aug. 10, 2017 including the specification, drawings and abstract is incorporated herein by reference in its entirety.

BACKGROUND

1. Technical Field

The present disclosure relates to a high-pressure container and a shell reinforcing layer wrapping method.

2. Description of Related Art

Japanese Patent Application Publication No. 2004-42277 (JP 2004-42277 A) discloses an disclosure related to a tubular liner. This tubular liner is formed by a laminated fiber-reinforced sheet body in which a first fiber-reinforced sheet and a second fiber-reinforced sheet are integrated. The first fiber-reinforced sheet and the second fiber-reinforced sheet are integrated such that the fiber directions of their respective reinforcing fibers are oriented in different directions, and the rigidity of the tubular liner is thereby enhanced.

SUMMARY

However, being composed of the first fiber-reinforced sheet and the second fiber-reinforced sheet that is placed over the entire surface of the first fiber-reinforced sheet, the laminated fiber-reinforced sheet body of the tubular liner disclosed in JP 2004-42277 A causes a cost increase. Thus, in this respect, there is room for improvement in the above related art.

The present disclosure provides a high-pressure container and a shell reinforcing layer wrapping method that can achieve both enhancing the rigidity and keeping the cost down.

A high-pressure container according to a first aspect of the present disclosure includes: a shell which has a cylindrical shape and an opening opened at at least one end in an axial direction; a cap that is disposed partially inside the opening to close the opening; and a shell reinforcing layer having a first reinforcing layer that is wrapped in layers around an outer circumferential surface of the shell, and a second reinforcing layer that is placed over a region of the first reinforcing layer and integrated with the first reinforcing layer. The first reinforcing layer is made of a first fiber-reinforced resin having a fiber direction oriented in a circumferential direction of the shell, and the second reinforcing layer is made of a second fiber-reinforced resin having a fiber direction oriented in the axial direction of the shell.

According to the first aspect, the shell has a cylindrical shape, and at least one end of the shell in the axial direction of the shell (hereinafter referred to simply as the "axial direction") is open, and this end is closed as the cap is inserted at least partially into the end. The shell reinforcing layer having the first reinforcing layer that is made of the first fiber-reinforced resin having the fiber direction oriented in the circumferential direction of the shell (hereinafter referred to simply as the "circumferential direction"), and the second reinforcing layer that is integrated with the first reinforcing layer and made of the second fiber-reinforced resin having the fiber direction oriented in the axial direction, is wrapped in layers around the outer circumferential surface of the shell. Thus, the rigidity of the shell in the circumferential direction and the radial direction is enhanced.

Here, the second reinforcing layer is placed over a region of the first reinforcing layer. Accordingly, the amount of second reinforcing layer used is smaller than the amount of first reinforcing layer used. Thus, the cost can be kept down.

In the first aspect of the present disclosure, the cap may have a projection that digs into the shell reinforcing layer in a direction orthogonal to the axial direction of the shell by being pressed toward a radially outer side of the shell, and the second reinforcing layer may be provided farther on the radially outer side of the shell than a leading end of the projection. The "direction orthogonal to the axial direction" here is a concept including not only an exactly orthogonal direction but also a "substantially orthogonal direction" that is regarded as an orthogonal direction based on technical common sense.

According to this configuration, the cap has the projection. This projection digs into the shell reinforcing layer by being pressed toward the radially outer side of the shell, so that the cap is restricted from moving along the axial direction. This can eliminate the need for another member that serves to prevent the cap from coming off the shell. Moreover, since the projection of the cap digs into the shell reinforcing layer in a direction orthogonal to the axial direction, a load exerted by a high-pressure fluid housed inside the shell onto the cap can be efficiently transmitted to the shell reinforcing layer.

The second reinforcing layer is provided in a region other than a part of the shell reinforcing layer near the outer circumferential surface of the shell in a thickness direction of the shell reinforcing layer. In other words, the second reinforcing layer is provided farther on the radially outer side of the shell than a leading end of the projection. Thus, only the first reinforcing layer having the fiber direction oriented in the circumferential direction is provided in the part of the shell reinforcing layer near the outer circumferential surface of the shell. This can reduce the likelihood that, when the projection of the cap digs into the shell reinforcing layer from the inner circumferential side, the fibers of the second reinforcing layer having the fiber direction oriented in the axial direction are cut by the projection digging into the second reinforcing layer. Thus, a decrease in the rigidity of the high-pressure container resulting from cutting of the fibers can be avoided.

In the first aspect of the present disclosure, a part of the shell reinforcing layer may form an extended part that does not come into contact with the outer circumferential surface of the shell and that is extended relative to the shell in the axial direction of the shell. The projection may dig into the extended part.

In the first aspect of the present disclosure, the projection may have a plurality of saw-tooth-shaped portions.

A shell reinforcing layer wrapping method according to a second aspect of the present disclosure includes: bonding a sheet-shaped second reinforcing layer to a region of a sheet-shaped first reinforcing layer such that a fiber direction of a first fiber-reinforced resin included in the first reinforcing layer is oriented orthogonal to a fiber direction of a second fiber-reinforced resin included in the second reinforcing layer; and wrapping the first reinforcing layer, with the second reinforcing layer bonded thereto, around an outer circumferential surface of a cylindrical shell such that the fiber direction of the first fiber-reinforced resin included in the first reinforcing layer is oriented along a circumferential direction of the shell. This wrapping method is applied to a high-pressure container that has the shell and a shell reinforcing layer having the first reinforcing layer and the second reinforcing layer.

According to the second aspect, first, as the first step, the sheet-shaped second reinforcing layer is bonded to the sheet-shaped first reinforcing layer. Next, as the second step, the shell reinforcing layer is formed by wrapping the first reinforcing layer around the outer circumferential surface of the shell such that the fiber direction of the first reinforcing layer is oriented along the circumferential direction. Here, in the second aspect of the present disclosure, the first reinforcing layer and the second reinforcing layer are bonded together by undergoing the first step. Thus, the first reinforcing layer and the second reinforcing layer having different fiber directions can be wrapped around the outer circumferential surface of the shell at the same time in the second step, instead of these reinforcing layers being wrapped independently in separate steps. It is therefore possible to enhance the rigidity of the high-pressure container without increasing the assembly man-hours.

In the second aspect of the present disclosure, at least one end of the shell in an axial direction may be open to form an opening. The second aspect of the present disclosure may further include inserting a cap into the opening.

The second aspect of the present disclosure may further include pressing the cap toward a radially outer side of the shell. The cap may have a projection that digs into the shell reinforcing layer in a direction orthogonal to the axial direction of the shell as the cap is pressed toward the radially outer side of the shell, and the second reinforcing layer may be provided farther on the radially outer side of the shell than a leading end of the projection.

In the second aspect of the present disclosure, a part of the shell reinforcing layer may form an extended part that does not come into contact with the outer circumferential surface of the shell and that is extended relative to the shell in the axial direction of the shell. The projection may dig into the extended part.

In the second aspect of the present disclosure, the projection may have a plurality of saw-tooth-shaped portions.

In the first and second aspects, the fiber direction of the first reinforcing layer includes not only an exactly circumferential direction but also a "substantially circumferential direction" that is regarded as a circumferential direction based on technical common sense. The fiber direction of the second reinforcing layer includes not only an exactly axial direction but also a "substantially axial direction" that is regarded as an axial direction based on technical common sense.

The first aspect has an excellent advantage of being able to achieve both enhancing the rigidity of the high-pressure container and keeping the cost down.

The first aspect has an excellent advantage of being able to achieve both enhancing the rigidity of the high-pressure container and further keeping the cost down.

The second aspect has an excellent advantage of being able to improve the productivity.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure will be described below using FIG. 1 to FIG. 4.

Figure 1:
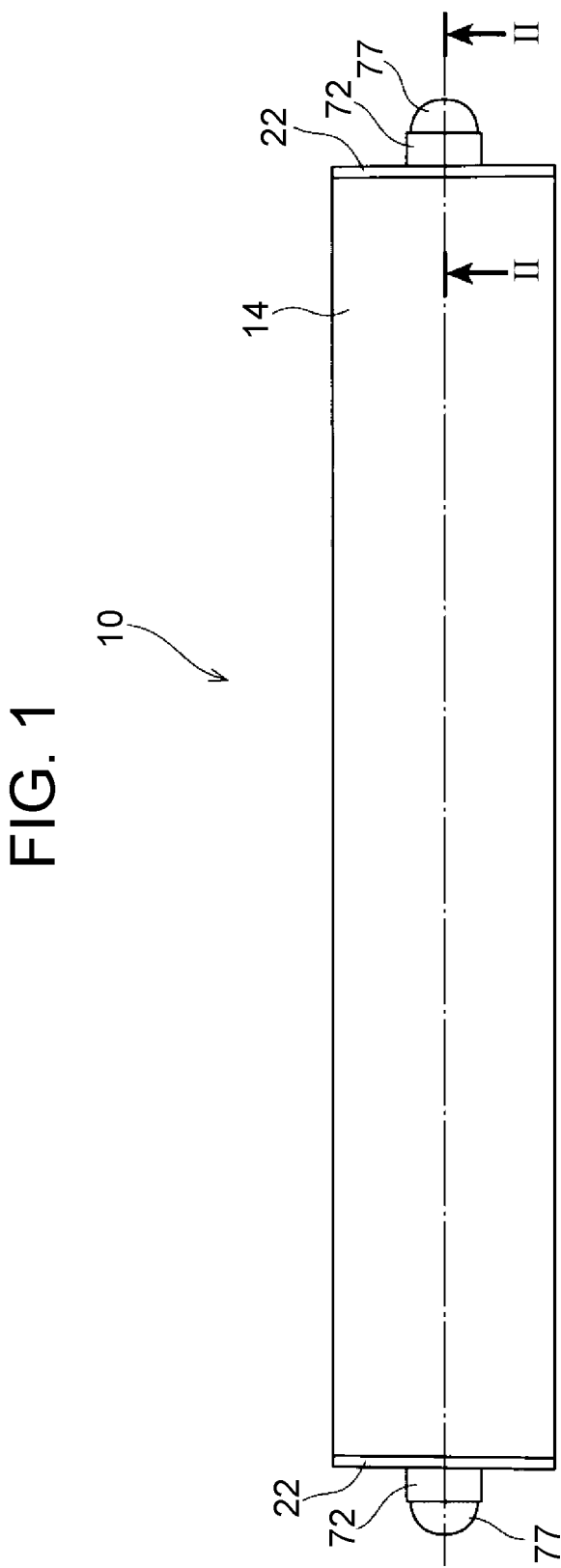
FIG. 1 is a schematic side view showing a high-pressure container according to an embodiment.

A tank module provided in a vehicle (not shown) has a configuration in which a plurality of high-pressure tanks 10 as high-pressure containers shown in FIG. 1 is combined with one another. For example, the high-pressure tanks 10 arranged below a floor panel (not shown) of a fuel cell vehicle in a vehicle height direction are coupled to one another.

Figure 2:
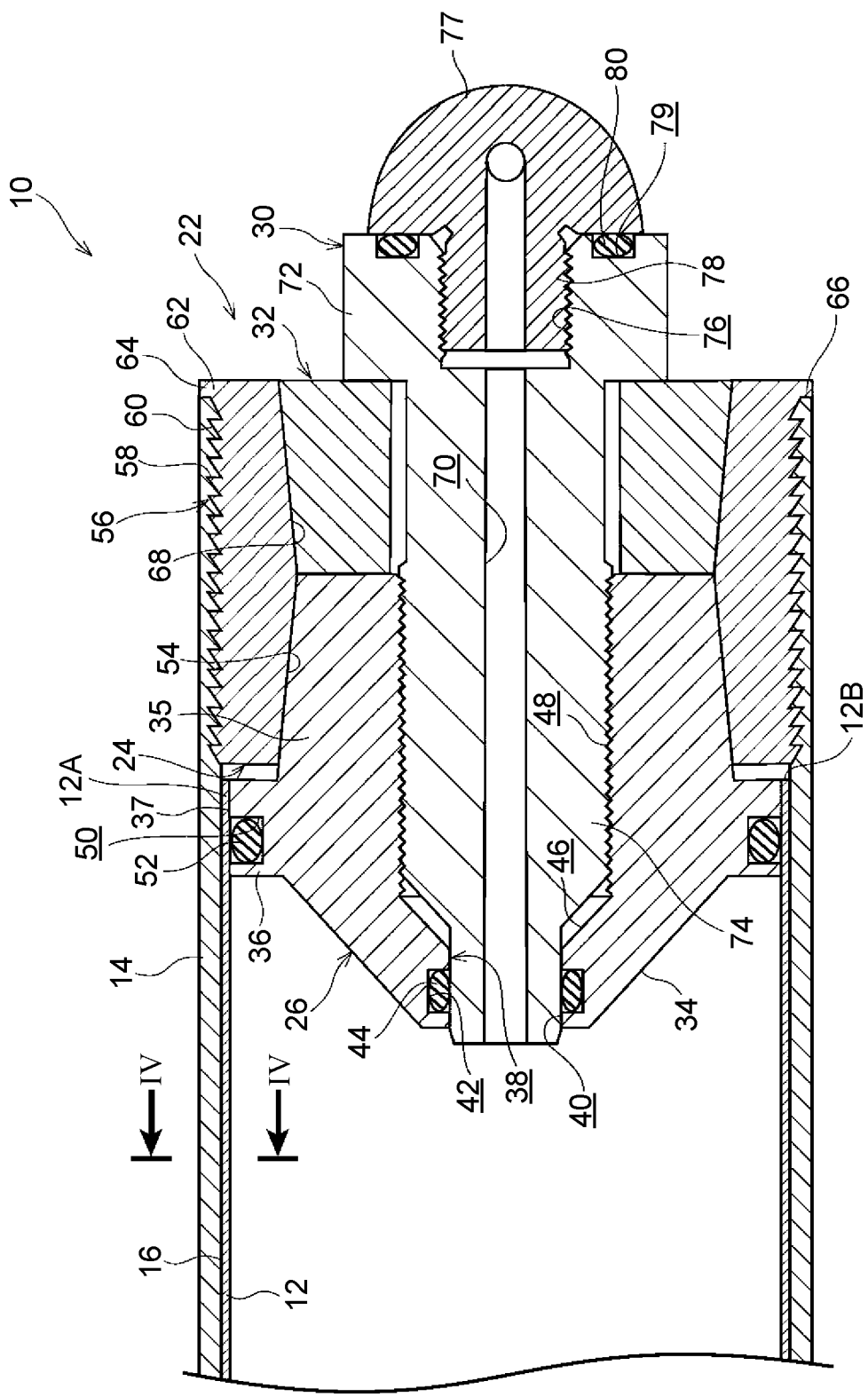
FIG. 2 is an enlarged sectional view showing a section along line II-II in FIG. 1.

The high-pressure tank 10 has, for example, a substantially columnar shape with an axial direction (long-side direction) thereof oriented in a vehicle length direction. As shown in FIG. 2, the high-pressure tank 10 includes a shell 12 and a shell reinforcing layer 14. The shell 12 has a cylindrical shape of which a pair of ends 12A in the axial direction is open, and for example, is made of an aluminum alloy. In the following, only the end 12A on one side will be described, but the end 12A on the other side has the same configuration.

Figure 3:
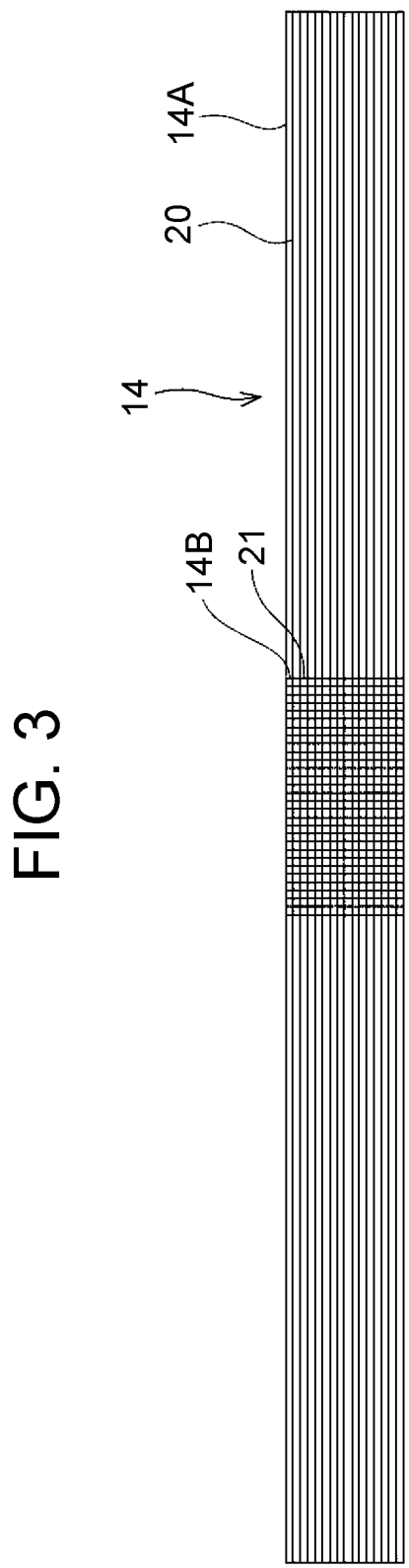
FIG. 3 is a schematic development showing a shell reinforcing layer of the high-pressure container according to the embodiment in a developed state.

The shell reinforcing layer 14 is a carbon fiber reinforced polymer (CFRP) sheet, and is wrapped around an outer circumferential surface 16 of the shell 12. As shown in FIG. 3, the shell reinforcing layer 14 has a rectangular sheet shape in a developed state, and the length in a short-side direction of the shell reinforcing layer 14 in the developed state is set to be slightly larger than the length of the shell 12 in the axial direction. The shell reinforcing layer 14 is composed of a first reinforcing layer 14A and a second reinforcing layer 14B. The first reinforcing layer 14A is made of a carbon fiber reinforced polymer in which carbon fibers 20 are arrayed along the circumferential direction in a state where the first reinforcing layer 14A is wrapped around the outer circumferential surface 16 of the shell 12. In other words, the fiber direction of the first reinforcing layer 14A is oriented in the circumferential direction. To make the fiber direction of the carbon fibers 20 easily visible, FIG. 3 shows a smaller number of the carbon fibers 20 than the actual number.

Figure 4:
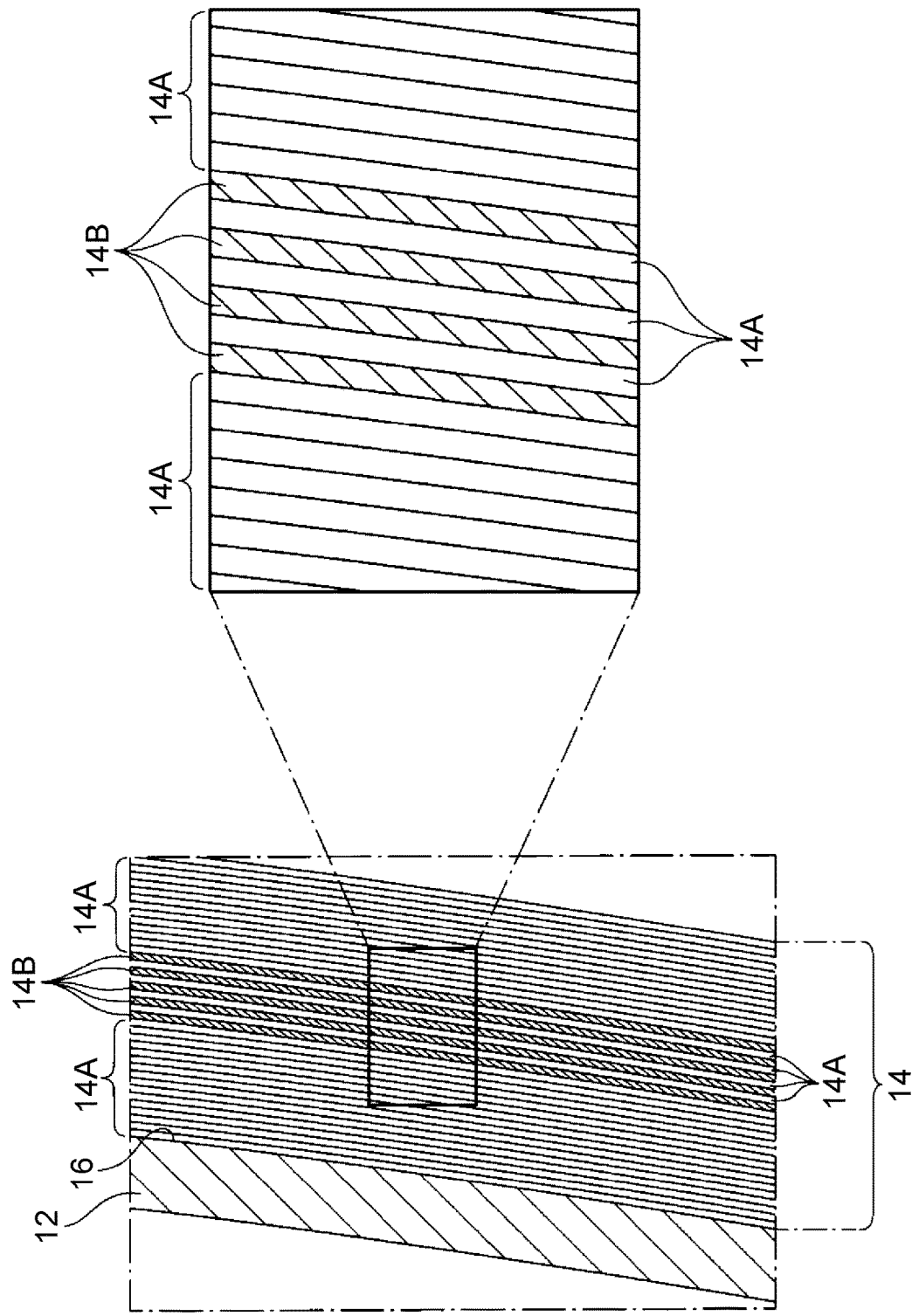
FIG. 4 is an enlarged sectional view showing a section along line IV-IV in FIG. 2.

The second reinforcing layer 14B is made of a carbon fiber reinforced polymer in which carbon fibers 21 are arrayed along the axial direction in a state where the second reinforcing layer 14B is wrapped around the outer circumferential surface 16 of the shell 12. In other words, the fiber direction of the second reinforcing layer 14B is oriented in the axial direction. The second reinforcing layer 14B is provided in only a part of the shell reinforcing layer 14. Specifically, the second reinforcing layer 14B is placed over only a substantially central part in the long-side direction of the first reinforcing layer 14A in the developed state. As shown in FIG. 4, therefore, the second reinforcing layer 14B (the diagonally hatched portions in FIG. 4) is provided in only a substantially central part in a thickness direction of the shell reinforcing layer 14 in a state where the shell reinforcing layer 14 is wrapped around the outer circumferential surface 16 of the shell 12. In other words, the second reinforcing layer 14B is provided in a region other than a part of the shell reinforcing layer 14 near the outer circumferential surface 16 of the shell 12 in the thickness direction of the shell reinforcing layer 14. In this embodiment, the part of the shell reinforcing layer 14 near the outer circumferential surface 16 of the shell 12 in the thickness direction refers to a region where a leading end of a projection 24 of a cap 22, to be described later, digs into the shell reinforcing layer 14 in the thickness direction of the shell reinforcing layer 14. Thus, the second reinforcing layer 14B is provided farther on a radially outer side of the shell 12 than the region where the projection 24 digs into the shell reinforcing layer 14 in the thickness direction of the shell reinforcing layer 14. The first reinforcing layer 14A is provided farther on a radially inner side of the shell 12 than the second reinforcing layer 14B.

As shown in FIG. 2, the cap 22 is provided at the end 12A of the shell 12 on an axially outer side so as to close the opening of the shell 12. A portion of the cap 22 that faces an end surface 12B of the end 12A of the shell 12 is the projection 24 to be described later, and the projection 24 and the end surface 12B of the end 12A of the shell 12 are separated from each other.

The cap 22 has a contact part 26, the projection 24, a fastening tool 30, and a pressing part 32. The contact part 26 has a contact main body 34 having a substantially cylindrical shape, and a packing housing portion 36 that protrudes from an outer circumference of the contact main body 34 toward the radially outer side. A surface of the contact main body 34 on an axially inner side has a substantially conical shape that extends toward the axially outer side so as to be oriented toward the radially outer side. A fastening hole 38 is formed at a radially central part of the contact main body 34 so as to extend therethrough along the axial direction. A fastening hole inner part 40 that forms a part of the fastening hole 38 on the axially inner side is provided with a groove 42 that is formed so as to be recessed toward the radially outer side and an O-ring 44 that is housed inside the groove 42. The fastening hole 38 has a large-diameter portion 46 which is located on the axially outer side of the fastening hole inner part 40 and of which the diameter increases toward the radially outer side from the fastening hole inner part 40, and a fastening hole outer part 48 that is located on the axially outer side of the large-diameter portion 46 and extended toward the axially outer side with a substantially constant diameter. An internal thread is formed in an inner circumferential surface of the fastening hole outer part 48.

An outer circumferential surface 37 of the packing housing portion 36 is in contact with an inner circumferential surface of the shell 12, and a groove 50 is formed at a part of the outer circumferential surface 16. An O-ring 52 that is elastically deformed along the radial direction of the shell 12 is housed inside the groove 50.

An outer circumferential surface of a pressing part 35 that forms a part of the contact main body 34 on the axially outer side from the packing housing portion 36 extends toward the axially outer side so as to be inclined toward the radially inner side of the contact main body 34. The inclination angle of this outer circumferential surface is substantially equal to the inclination angle of a taper 54 to be described later.

The projection 24 has a substantially cylindrical shape, and is provided farther on the axially outer side than the packing housing portion 36 of the contact main body 34 and on the outer circumferential side of the pressing part 32, in a portion where only the shell reinforcing layer 14 is provided (farther on the axially outer side than the end 12A of the shell 12). The projection 24 is divided into a plurality of parts (not shown) as seen from the axial direction by parting lines (not shown) extending along the axial direction, and a plurality of saw-tooth-shaped portions 56 as projections is formed on an outer circumferential surface of the projection 24. The saw-tooth-shaped portions 56 are formed continuously along a circumferential direction of the projection 24, and a reaction force surface 58 constituting a surface of each saw-tooth-shaped portion 56 on the axially outer side is formed so as to be oriented orthogonal to the axial direction. An inclined surface 60 constituting a surface of each saw-tooth-shaped portion 56 on the axially inner side extends toward the axially outer side so as to be inclined toward the radially outer side of the projection 24. The inclination angle formed by the inclined surface 60 and the reaction force surface 58 at a leading end of the saw-tooth-shaped portion 56 is an acute angle.

A flange 64 that is extended farther toward the radially outer side than the saw-tooth-shaped portions 56 is formed at an end 62 of the projection 24 on the axially outer side. A surface of the flange 64 on the axially inner side is in contact with an end surface 66 of the shell reinforcing layer 14 on the axially outer side.

Tapers 54, 68 are formed in an inner circumferential surface of the projection 24. The taper 54 is formed on the axially inner side in the inner circumferential surface of the projection 24, and extends toward the axially outer side so as to be inclined toward the radially inner side. The taper 68 is formed on the axially outer side in the inner circumferential surface of the projection 24, and extends toward the axially inner side so as to be inclined toward the radially inner side. A border between the taper 54 and the taper 68 is located substantially at the center of the inner circumferential surface of the projection 24 in the axial direction.

The pressing part 32 has a substantially cylindrical shape of which the length in the axial direction is substantially equal to the length of the taper 68 in the axial direction, and is inserted in the projection 24. An outer circumferential surface of the pressing part 32 extends toward the axially inner side so as to be inclined toward the radially inner side at the same angle as the taper 68. A through-hole 70 inside the pressing part 32 has substantially the same diameter as the fastening hole outer part 48 of the contact main body 34

The fastening tool 30 is provided on the axially outer side of the pressing part 32, and a surface of a head 72 of the fastening tool 30 on the axially inner side is in contact with a surface of the pressing part 32 on the axially outer side, and a shaft 74 of the fastening tool 30 is inserted in the through-hole 70 of the pressing part 32 and the fastening hole 38 of the contact main body 34. An external thread is formed on the shaft 74, and the pressing part 32, the contact main body 34, and the projection 24 are fastened together as this external thread is engaged with the internal thread of the fastening hole outer part 48 of the contact main body 34. A leading end of the fastening tool 30 has substantially the same diameter as the fastening hole inner part 40, and the O-ring 44 inside the groove 42 is elastically deformed toward the radially outer side as the leading end of the fastening tool 30 is inserted into the fastening hole inner part 40.

A fastened portion 76 is formed in the head 72 of the fastening tool 30. The fastened portion 76 is a groove having a one-end-closed columnar shape and opening toward the axially outer side. An internal thread is formed in an inner circumferential surface of the fastened portion 76, and this internal thread is engaged with a fastening portion 78 of a common rail 77. A groove 79 is formed in a surface of the head 72 on the axially outer side, at a position on the radially outer side of the fastened portion 76, and an O-ring 80 is housed inside the groove 79. The through-hole 70 as a communication part is formed in the fastening tool 30 so as to extend therethrough along the axial direction.

Fastening of Cap 22

Next, fastening of the cap 22 will be described. To insert the cap 22 into the shell 12, the fastening tool 30 fastening the contact part 26 is loosened to such an extent that the leading ends of the saw-tooth-shaped portions 56 of the projection 24 come into contact with an inner circumferential surface of the shell reinforcing layer 14. Thus, the projection 24 is disposed on the radially inner side, so that the projection 24, and the whole cap 22, can be inserted into the shell 12. Here, the flange 64 of the projection 24 comes in contact with the end surface 66 of the shell reinforcing layer 14, limiting further movement of the projection 24 into the shell 12.

When the fastening tool 30 is fastened after the cap 22 is inserted into the shell 12, the contact part 26 moves toward the axially outer side while the pressing part 32 moves toward the axially inner side. Thus, the pressing part 35 of the contact part 26 and the pressing part 32 each shift the projection 24 toward the radially outer side along the tapers 54, 68, causing the saw-tooth-shaped portions 56 of the projection 24 to dig into the inner circumferential surface of the shell reinforcing layer 14 (the part thereof near the outer circumferential surface 16) in a direction orthogonal to the axial direction. As a result, the cap 22 is fixed to the shell 12, and the gap between the cap 22 and the shell 12 is maintained in a sealed state. The leading end of each saw-tooth-shaped portion 56 digs into the first reinforcing layer 14A of the shell reinforcing layer 14, between one carbon fiber 20 and another carbon fiber 20 adjacent thereto.

In a state where the plurality of high-pressure tanks 10 having been described above is arrayed, their respective caps 22 are fastened to the common rail 77. The common rail 77 is connected to a fuel cell stack, a supply pipe, etc. through a valve (not shown).

Shell Reinforcing Layer Manufacturing Method

In this embodiment, first, in a first step, the sheet-shaped second reinforcing layer 14B is bonded to the sheet-shaped first reinforcing layer 14A as shown in FIG. 3. Next, in a second step, the first reinforcing layer 14A is wrapped around the outer circumferential surface 16 of the shell 12 such that the fiber direction of the first reinforcing layer 14A is oriented along the circumferential direction as shown in FIG. 4. Then, with a wrapping tape (not shown) wrapped around the first reinforcing layer 14A and the second reinforcing layer 14B from an outer circumferential side, the first reinforcing layer 14A and the second reinforcing layer 14B are hardened to form the shell reinforcing layer 14. Here, in this embodiment, the first reinforcing layer 14A and the second reinforcing layer 14B are bonded together by undergoing the first step. Thus, the first reinforcing layer 14A and the second reinforcing layer 14B having different fiber directions can be wrapped around the outer circumferential surface 16 of the shell 12 at the same time in the second step, instead of these reinforcing layers being wrapped independently in separate steps. It is therefore possible to enhance the rigidity of the high-pressure tank 10 without increasing the assembly man-hours. As a result, the productivity can be improved.

Workings and Effects

Next, the workings and effects of this embodiment will be described.

In this embodiment, as shown in FIG. 1, the shell 12 has a cylindrical shape and the ends 12A thereof in the axial direction are open. Each end 12A is closed as the cap 22 is inserted at least partially into the end 12A. The shell reinforcing layer 14 having the first reinforcing layer 14A that is made of the fiber-reinforced resin having the fiber direction oriented in the circumferential direction, and the second reinforcing layer 14B that is integrated with the first reinforcing layer 14A and made of the fiber-reinforced resin having the fiber direction oriented in a substantially axial direction, is wrapped in layers around the outer circumferential surface 16 of the shell 12. Thus, when a high-pressure fluid is housed inside the high-pressure tank 10, the high-pressure tank 10 tries to expand radially outward as seen from the axial direction, but this expansion is restricted by the first reinforcing layer 14A having the fiber direction oriented in the circumferential direction. At the same time, when a high-pressure fluid is housed inside the high-pressure tank 10, the high-pressure tank 10 tries to expand outward in a plate thickness direction of the shell 12 as seen from a direction orthogonal to the axis direction, but this expansion is restricted by the second reinforcing layer 14B having the fiber direction oriented in the axial direction. This means that the rigidity of the high-pressure tank 10 in the circumferential direction and the radial direction is enhanced.

Here, as shown in FIG. 4, the second reinforcing layer 14B is provided in a region of the first reinforcing layer 14A in a thickness direction. Accordingly, the amount of second reinforcing layer 14B used is smaller than the amount of first reinforcing layer 14A used. Thus, the cost can be kept down. It is therefore possible to achieve both enhancing the rigidity of the high-pressure tank 10 and keeping the cost down.

The cap 22 has the projection 24. The projection 24 digs into the shell reinforcing layer 14 by being pressed toward the radially outer side of the shell 12, so that the cap 22 is restricted from moving along the axial direction. This can eliminate the need for another member that serves to prevent the cap 22 from coming off the shell 12. Moreover, since the projection 24 of the cap 22 digs into the shell reinforcing layer 14 in a direction orthogonal to the axial direction, a load exerted by a high-pressure fluid housed inside the shell 12 onto the cap 22 can be efficiently transmitted to the shell reinforcing layer 14.

The second reinforcing layer 14B is provided in a region other than the part of the shell reinforcing layer 14 near the outer circumferential surface 16 of the shell 12 in the thickness direction of the shell reinforcing layer 14. Thus, only the first reinforcing layer 14A having the fiber direction oriented in the circumferential direction is provided in the part of the shell reinforcing layer 14 near the outer circumferential surface 16 of the shell 12. This can reduce the likelihood that, when the projection 24 of the cap 22 digs into the shell reinforcing layer 14 from the inner circumferential side, the carbon fibers 21 having the fiber direction oriented in the axial direction are cut by the projection 24 digging into the second reinforcing layer 14B. Thus, a decrease in the rigidity of the high-pressure tank 10 resulting from cutting of the carbon fibers 21 can be avoided by the projection. It is therefore possible to achieve both enhancing the rigidity of the high-pressure tank 10 and further keeping the cost down.

The part of the shell reinforcing layer 14 on the radially outer side is composed only of the first reinforcing layer 14A. In other words, the part of the shell reinforcing layer 14 on the radially outer side is provided with the fiber-reinforced resin having the fiber direction oriented in the circumferential direction. This can reduce the likelihood that the shell reinforcing layer 14 breaks while being wrapped around the shell 12 with tension applied to the shell reinforcing layer 14 in the circumferential direction so as not to create creases. Thus, defects occurring during processing can be avoided.

Since the end surface 12B of the end 12A of the shell 12 and the projection 24 of the cap 22 are separated from each other, the shell 12 can be prevented from coming into contact with the projection 24 even when the end 12A of the shell 12 is slightly displaced. Thus, displacement of the end 12A of the shell 12 can be tolerated to some extent, so that the processing accuracy need not be increased and the yield can be improved. It is therefore possible to further keep the cost down and improve the productivity.

Figure 5:
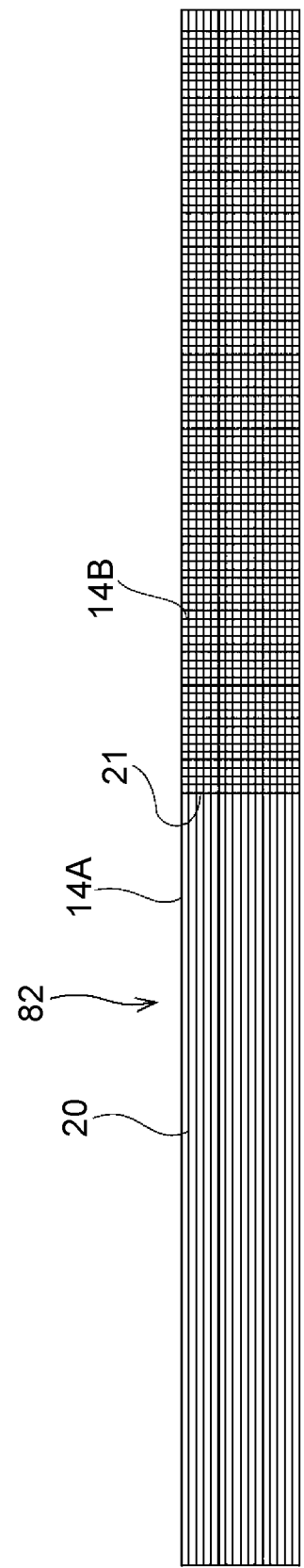
FIG. 5 is a schematic development corresponding to FIG. 3, showing a shell reinforcing layer of a high-pressure container according to a modified example in a developed state.
Figure 6:
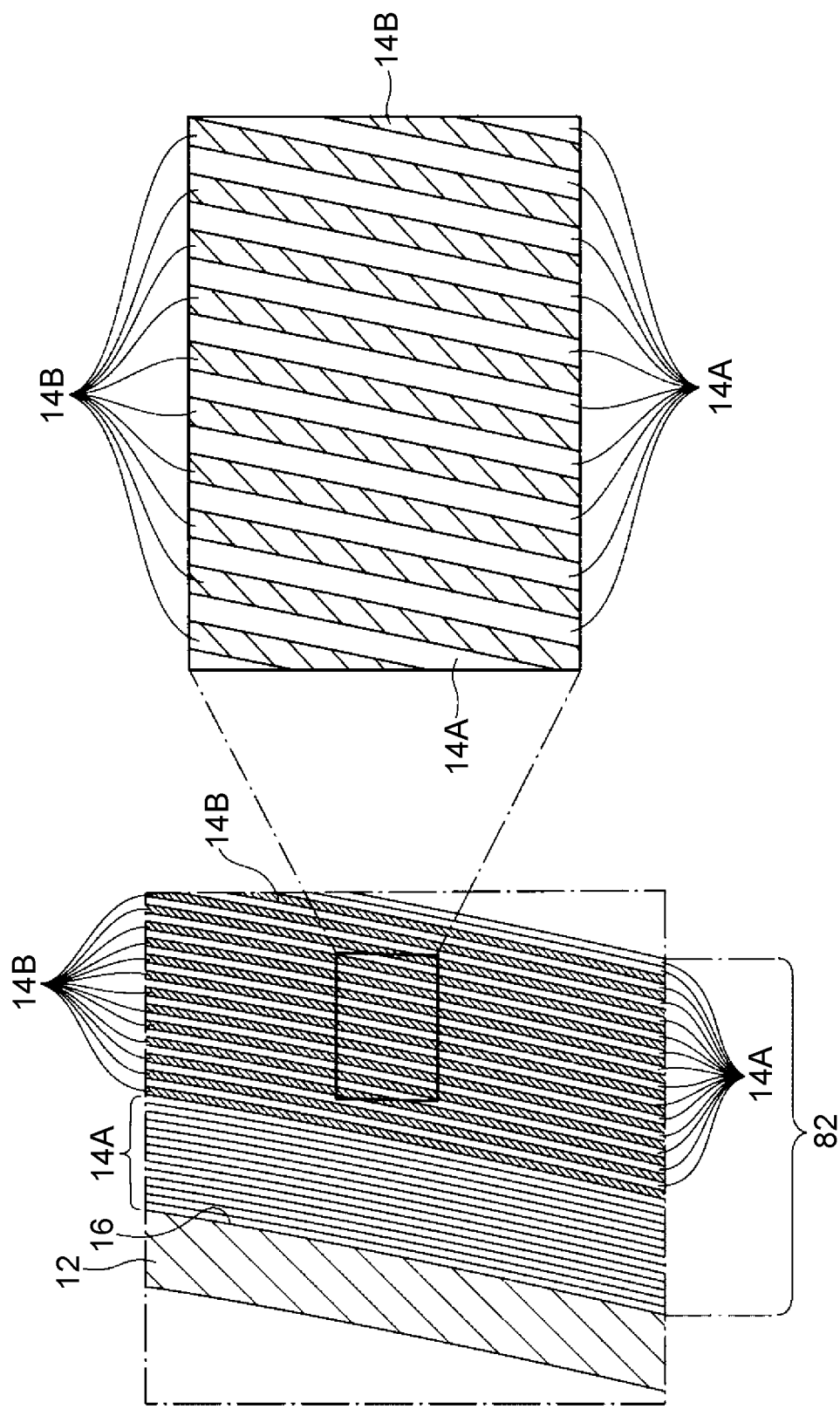
FIG. 6 is an enlarged sectional view corresponding to FIG. 4, showing a section of the high-pressure container in the modified example.
Figure 7:
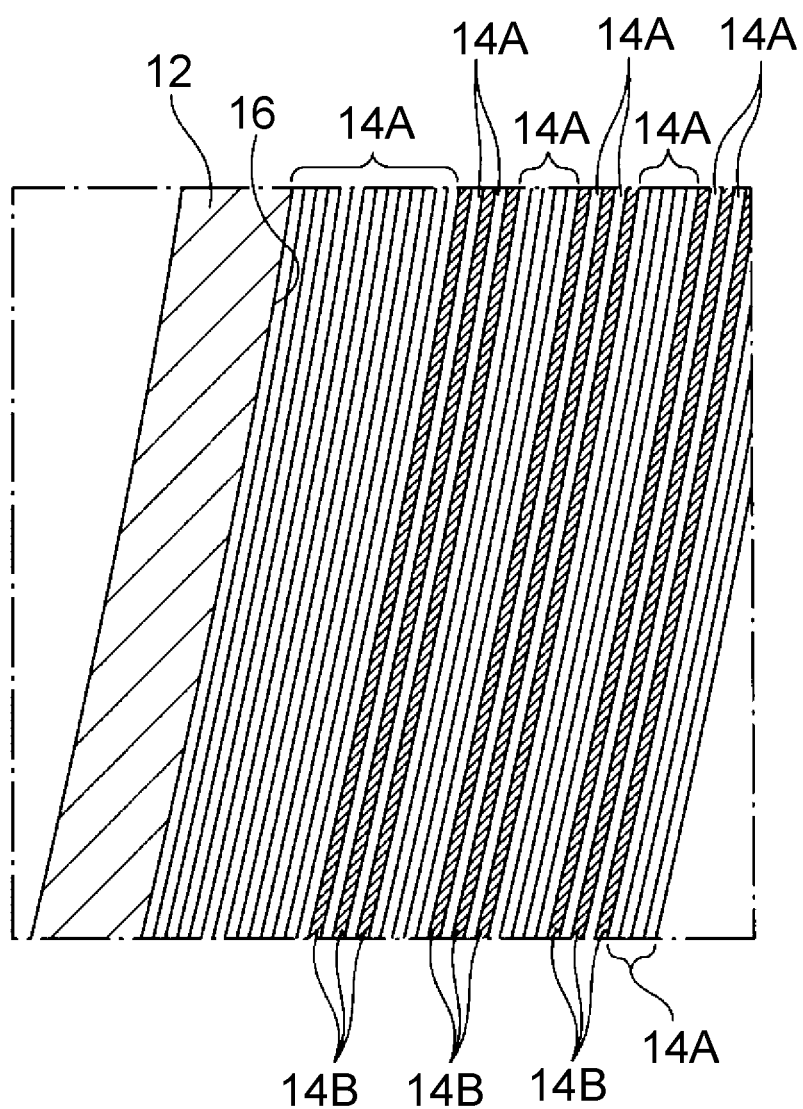
FIG. 7 is an enlarged sectional view corresponding to FIG. 4, showing a section of a high-pressure container in another modified example.

In the above embodiment, the second reinforcing layer 14B is placed over only the substantially central part in the long-side direction of the first reinforcing layer 14A in the developed state. However, the present disclosure is not limited to this configuration. As shown in FIG. 5, the second reinforcing layer 14B may be continuously placed over a region of the first reinforcing layer 14A from the substantially central part in the long-side direction of the first reinforcing layer 14A in the developed state to one end thereof in the long-side direction. In this case, as shown in FIG. 6, in a state where a shell reinforcing layer 82 is wrapped around the outer circumferential surface 16 of the shell 12, the second reinforcing layer 14B (the diagonally hatched portions in FIG. 6) is provided in only a region from a substantially central part in a thickness direction of the shell reinforcing layer 82 to near a radially outer side of the shell reinforcing layer 82. Compared with the shell reinforcing layer 14, the shell reinforcing layer 82 has a larger amount of the second reinforcing layer 14B placed over the first reinforcing layer 14A, and therefore can further enhance the rigidity of the high-pressure tank 10. Thus, the amount of second reinforcing layer 14B can be changed appropriately according to the required rigidity of the high-pressure tank 10. Alternatively, the second reinforcing layers 14B may be provided at a plurality of positions, so as to be separated from each other, in the thickness direction of the shell reinforcing layer 82 in the state where the shell reinforcing layer 82 is wrapped around the outer circumferential surface 16 of the shell 12 (see FIG. 7).

The part of the shell reinforcing layer 14 on the radially outer side is composed only of the first reinforcing layer 14A as shown in FIG. 4 and FIG. 6, but the present disclosure is not limited to this configuration. This part may be composed of the first reinforcing layer 14A and the second reinforcing layer 14B placed over each other.

The cap 22 is provided with the projection 24 as shown in FIG. 2, but the present disclosure is not limited to this configuration. A cap having no projection 24 may be inserted partially into the end of the shell 12, and the shell 12 may be wrapped in a fiber-reinforced resin integrally with this cap so as to prevent the cap from coming off the shell 12. In this case, the second reinforcing layer 14B may be provided in the part of the shell reinforcing layer 14 near the outer circumferential surface 16 of the shell 12 in the thickness direction of the shell reinforcing layer 14 as shown in FIG. 4.

Both ends 12A of the shell 12 in the axial direction are open, but the present disclosure is not limited to this configuration. At least one of the ends 12A may be open.

The fiber direction of the second reinforcing layer 14B is oriented in the axial direction, but the present disclosure is not limited to this configuration. This fiber direction may be somewhat inclined relative to the axial direction.

While the embodiment of the present disclosure has been described above, it should be understood that the present disclosure is not limited to the above embodiment but can be implemented with various modifications other than those described above made thereto within the scope of the gist of the disclosure.

What is claimed is:

1. A high-pressure container comprising:
   a shell which has a cylindrical shape and an opening opened at least at one end in an axial direction;
   a cap that is disposed partially inside the opening to close the opening; and
   a shell reinforcing layer having a first reinforcing layer that is wrapped in layers around an outer circumferential surface of the shell, and a second reinforcing layer that is placed over a region of the first reinforcing layer and integrated with the first reinforcing layer, the first reinforcing layer being made of a first fiber-reinforced resin having a fiber direction oriented in a circumferential direction of the shell, the second reinforcing layer being made of a second fiber-reinforced resin having a fiber direction oriented in the axial direction of the shell, the circumferential direction of the shell being substantially perpendicular to the axial direction of the shell, a wrapping direction of wrapping the first reinforcing layer being a same direction as a wrapping direction of wrapping the second reinforcing layer.

2. The high-pressure container according to claim 1, wherein:
   the cap has a projection that digs into the shell reinforcing layer in a direction orthogonal to the axial direction of the shell by being pressed toward a radially outer side of the shell; and
   the second reinforcing layer is provided farther on the radially outer side of the shell than a leading end of the projection.

3. The high-pressure container according to claim 2, wherein:
   a part of the shell reinforcing layer forms an extended part that does not come into contact with the outer circumferential surface of the shell and that is extended relative to the shell in the axial direction of the shell; and
   the projection digs into the extended part.

4. The high-pressure container according to claim 2, wherein the projection has a plurality of saw-tooth-shaped portions.

5. A shell reinforcing layer wrapping method comprising:
   bonding a sheet-shaped second reinforcing layer to a region of a sheet-shaped first reinforcing layer such that a fiber direction of a first fiber-reinforced resin included in the first reinforcing layer is oriented orthogonal to a fiber direction of a second fiber-reinforced resin included in the second reinforcing layer; and
   wrapping the first reinforcing layer, with the second reinforcing layer bonded to the first reinforcing layer, around an outer circumferential surface of a shell having a cylindrical shape such that the fiber direction of the first fiber-reinforced resin included in the first reinforcing layer is oriented along a circumferential direction of the shell and the fiber direction of the second fiber-reinforced resin included in the second reinforcing layer is oriented along an axial direction of the shell, a wrapping direction of wrapping the first reinforcing layer being a same direction as a wrapping direction of wrapping the second reinforcing layer, wherein the shell reinforcing layer wrapping method is applied to a high-pressure container that has the shell and a shell reinforcing layer having the first reinforcing layer and the second reinforcing layer.

6. The shell reinforcing layer wrapping method according to claim 5, wherein:

at least one end of the shell in an axial direction is opened to form an opening; and the shell reinforcing layer wrapping method further comprises inserting a cap into the opening.

7. The shell reinforcing layer wrapping method according to claim 6, further comprising pressing the cap toward a radially outer side of the shell, wherein:

the cap has a projection that digs into the shell reinforcing layer in a direction orthogonal to the axial direction of the shell as the cap is pressed toward the radially outer side of the shell; and the second reinforcing layer is provided farther on the radially outer side of the shell than a leading end of the projection.

8. The shell reinforcing layer wrapping method according to claim 7, wherein:

a part of the shell reinforcing layer forms an extended part that does not come into contact with the outer circumferential surface of the shell and that is extended relative to the shell in the axial direction of the shell; and the projection digs into the extended part.

9. The shell reinforcing layer wrapping method according to claim 7, wherein the projection has a plurality of sawtooth-shaped portions.

\* \* \* \* \*